Dec. 20, 1949   P. S. DICKEY ET AL   2,491,606
CONTROL SYSTEM
Filed Jan. 30, 1946   4 Sheets-Sheet 1

FIG. 1

INVENTORS
PAUL S. DICKEY
AND ANTHONY J. HORNFECK
BY
Raymond D. Jenkins
ATTORNEY

INVENTORS
PAUL S. DICKEY
AND ANTHONY J. HORNFECK
BY Raymond D. Junkins
ATTORNEY Dec. 20, 1949     P. S. DICKEY ET AL     2,491,606

CONTROL SYSTEM

Filed Jan. 30, 1946     4 Sheets-Sheet 3

INVENTORS
PAUL S. DICKEY
AND ANTHONY J. HORNFECK
BY
Raymond W. Junkins
ATTORNEY

Dec. 20, 1949 P. S. DICKEY ET AL 2,491,606
CONTROL SYSTEM
Filed Jan. 30, 1946 4 Sheets-Sheet 4

INVENTORS
PAUL S. DICKEY
AND ANTHONY J. HORNFECK
BY
Raymond D. Junkins
ATTORNEY

Patented Dec. 20, 1949

2,491,606

UNITED STATES PATENT OFFICE 2,491,606

CONTROL SYSTEM

Paul S. Dickey, East Cleveland, and Anthony J. Hornfeck, Cleveland Heights, Ohio, assignors to Bailey Meter Company, a corporation of Delaware Application January 30, 1946, Serial No. 644,267

16 Claims. (Cl. 236—46)

1

The present invention relates to measuring and/or control systems, particularly of the electronic circuit type. A variable condition, quantity, quality, position or other variable which may be represented by an electrical resistance value may be continuously and instantaneously compared to a desired value and the deviation measured or used in control. The measurement so obtained may be used to effect a control of the same or another variable which may or may not contribute to the magnitude or change in magnitude of the variable being measured.

Specifically our present invention provides improvements in an electronic measuring and controlling circuit allowing a control standard value to be established in accordance with a predetermined time program. Thereafter the deviation of the actual value of the variable from the desired or programmed value is determined and indicated and may be used in control.

A further object of our present invention is a continuous subtraction of values which in effect is the same as the deviation between one variable and a predetermined standard.

Another object of our invention is the continuous manifestation of a comparison of a plurality of variables such as fluid rates of flow or variables in the operation of a power producing or utilizing apparatus wherein the deviation from unity in one direction or the other may be indicated, recorded or utilized in dictating a control of one of the variables or of another variable.

Still another object is the incorporation in such a measuring and controlling system of a telemetric circuit through whose agency the measuring and controlling circuit may be located at a considerable distance from the point of control or from the point of actual variation in the variable being measured or under control.

We have chosen to illustrate and describe our invention in connection with certain basic electronic measuring circuits as representative only and not limited thereto. In general, we describe our invention in connection with a phase sensitive a.-c. bridge network including a resistance thermometer. We illustrate and describe a telemetric circuit of the movable core transformer type and incorporate the measuring control in connection with electric furnaces, fuel fired furnaces and fluid proportioning as specific embodiments only.

2

Figure 1:
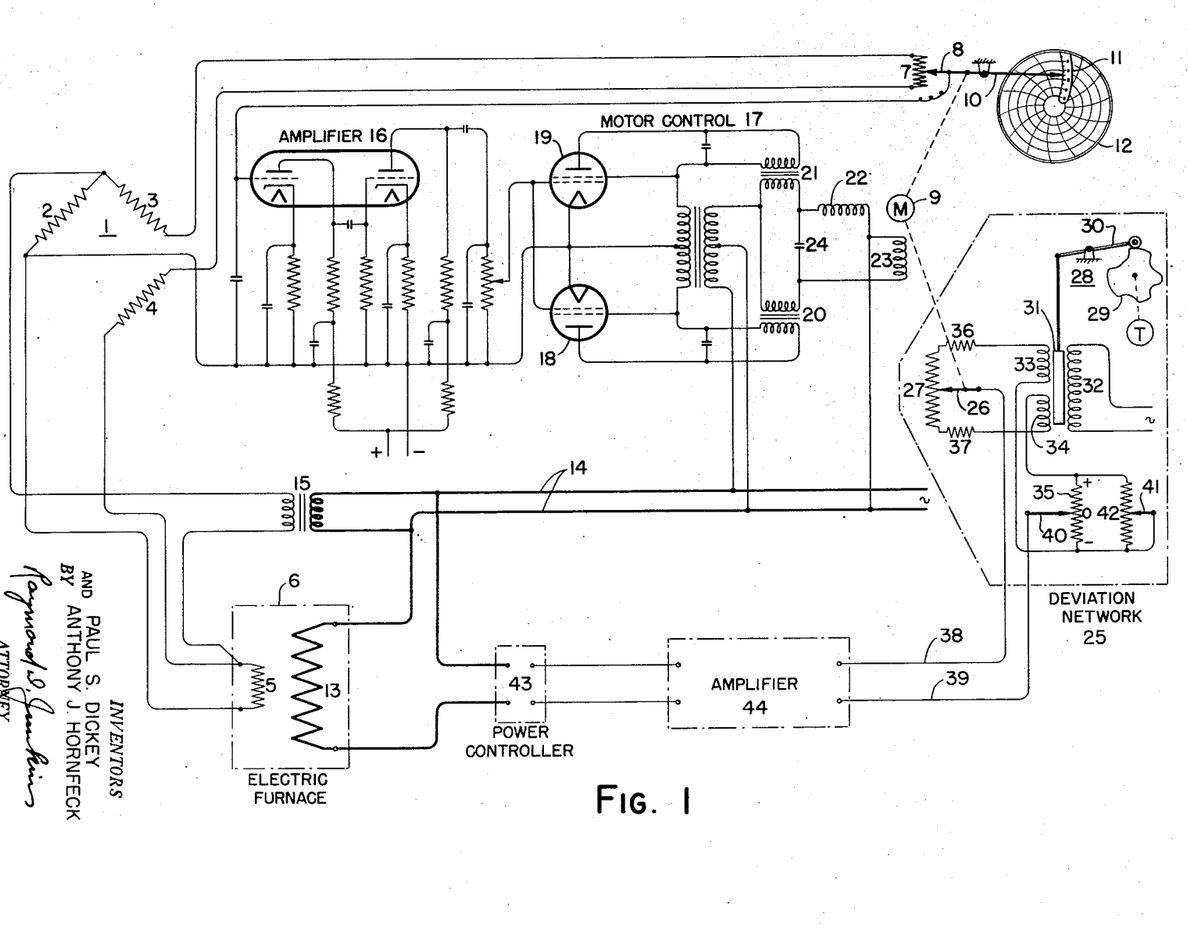
Fig. 1 is a schematic showing of a measuring and control circuit in accordance with our invention applied to an electric furnace.

All of the Figures of the drawings are shown in quite diagrammatic or schematic manner. In Fig. 1 we have shown the amplifier and motor control circuit in detail. We have not felt it necessary to duplicate such detail in the other figures and have therein indicated an amplifier and motor control circuit merely as blocks. Where identical parts or portions of the circuit occur in different drawings the same reference numerals have been utilized.

Referring now in particular to Fig. 1, we indicate at 1 a phase sensitive a.-c. bridge having fixed resistor arms 2, 3 and 4. The fourth arm of the bridge 1 is a resistance element 5 located in an electric furnace 6 and sensitive to the temperature thereof. For balancing the network we provide an adjustable resistance 7 provided with a movable contact arm 8 for proportioning the resistance 7 between the arms 3 and 4.

For positioning the contact arm 8 we provide a motor 9 which also positions an indicator 10 relative to a scale 11 and a revoluble chart 12, thereby providing an instantaneous indication as well as a continuous record of the value of temperature to which the resistance arm 5 is sensitive.

The furnace 6 is preferably heated by electric resistance element 13 receiving current from an a.-c. source 14, which also provides a.-c. supply to the bridge 1 through a transformer 15.

Preferably the bridge arm 5 is a platinum resistance measuring element. The conjugate corners of the bridge 1 are connected to an amplifier 16 and motor control 17 for the motor 9. For an understanding of a phase sensitive a.-c. bridge for measuring the resistance of the leg 5 subjected to temperature of the furnace 6 reference may be had to the Ryder Patents 2,275,317 and 2,333,393. The conjugate voltage supplied to the amplifier 16 assumes a balance or unbalance and a phase relation relative to the supply voltage dependent upon the magnitude and sense of the unbalanced condition of the bridge 1. The amplifier 16 selectively controls motor tubes 18 and 19. The tubes 18, 19 control the amount and direction of unbalance of saturable core reactors 20, 21 for directional and speed control of the capacitor-run motor 9 adapted to position the arms 8, 10.

The motor 9 is of an a.-c. type having windings 22 and 23 ninety electrical degrees apart and also having a capacitor 24. When alternating current flows directly through one of the windings and simultaneously through the other winding in series with the capacitor, the motor rotates in predetermined direction and at a speed determined by the extent of unbalance of the saturable core reactors 20, 21. It is not necessary to go into greater detail as to the construction and operation of the amplifier 16 and the motor control circuit 17, as reference may be had to the above mentioned Ryder patents.

So far we have described a known circuit arrangement for continuously measuring the temperature of the furnace 6 and providing a visual indication thereof upon the index 11 and a continuous record upon the chart 12. The balanceable network provides a continuous measurement without intermittent feeling devices, galvanometers, or other moving parts except for the power motor 9, which is selected to provide ample power to position the indicating-recording arm 10 and the balancing contact 8. Preferably and usually the elements 1, 16, 17, 9 are located in the casing containing the indicator and recorder and may be mounted on a panel board or at any desired central control station. Such a location may be adjacent to or remote from the furnace 6.

In our present invention additionally we provide a deviation network 25 for continuously comparing the actual value of the temperature or other variable with a desired or standard value. The network 25 continuously determines the deviation, if any, between the actual and the desired value of the variable or variables and utilizes such information in continuously visually advising the extent of deviation or as a basis for the control of the same or another variable which may or may not contribute to the change or maintenance of the original variable being measured.

Specifically, referring to Fig. 1, the network 1, 16, 17, is sensitive to the temperature of the furnace 6 at the resistance arm 5 for continuously determining such temperature and indicating it upon the index 11 and recording upon the chart 12. Simultaneously the motor 9 controls the position of a contact arm 26 along a slide wire potentiometer 27 of the deviation network 25. The deviation network preferably is located in the casing with the recorder and mechanically close to the motor 9.

In the embodiment of Fig. 1, we desirably continuously compare the actual temperature at the element 5 with a desired or standard temperature to be maintained within the furnace 6 and illustrate the deviation network 25 as containing a time cycle or program mechanism 28 establishing the desired or standard temperature which may be uniform over the 24-hour period or may be programmed to have a different temperature at different times of the day.

The program mechanism 28 includes a time motor T driving a program cam 29. A fulcrumed roller arm 30 is continuously positioned by the program cam 29 and in turn positions a magnetic core piece 31 relative to windings 32, 33, 34. The elements 31, 32, 33 and 34 constitute a movable core transformer wherein the primary winding 2 is continuously energized across an a.-c. source. The position of the core piece 31 in relation to the windings determines the inductive relation between the primary 32 and the secondaries 33, 34, and thereby the potential relation between the windings 33, 34.

Interposed between the windings 33 and 34 is a potentiometer or resistance 35. The elements 27, 33, 35 and 34 are connected in series loop with calibrating resistances 36, 37. As mentioned, the loop circuit receives energization inductively from the primary 32 through the coupling provided by the magnetic core piece 31. Across the loop are conductors 38 and 39 connected respectively to contact arms 26 and 40. The arrangement is such that the conductors 38, 39 divide the loop into two portions which may or may not be balanced insofar as sense and magnitude of potential are concerned. If the two portions of the loop are in balance, then the conjugate conductors 38, 39 are electrically null as to magnitude or sign of potential. If an unbalance occurs between the two portions of the loop, then a potential exists between the conductors 38, 39 of a sense and magnitude determined by the direction and extent of unbalance.

Assume first that the loop is in balance. No potential exists between the conjugate conductuctors 38, 39. If the contact arm 26 is moved in one direction along the resistance 27, the loop becomes unbalanced and a potential is set up between the conjugate conductors 38, 39 of a sense dependent upon the direction in which the contact 26 is moved.

Assume again that the loop is in balance. If the core piece 31 is moved in one direction, relative the windings 32, 33 and 34, then the inductive balance between the windings is disturbed, and either the winding 33 or the winding 34 is to a greater extent under the control of the core piece 31, and thus receives a greater inductive effect from the primary 32. A potential is established between the conjugate conductors 38, 39 whose sense is determined by the direction of movement of the core piece 31 and whose magnitude is determined by its extent of movement.

This analysis is, of course, on the assumption that the contact arm 40 is not moved from its previous position along the resistance 35, and that a contact arm 41 is not moved from its position along a resistance 42.

In general, the potential condition in the conjugate conductor 38, 39 is representative of the direction and extent of deviation of the actual temperature at the element 5 as compared to the desired temperature as represented by the position of the core piece 31 relative the windings 32, 33 and 34.

Such manifestation of coincidence or of deviation may be utilized in a control of the furnace 6 to eliminate deviation and to maintain the temperature at the element 5 in correspondence with the desired standard which may be a uniform standard or a programmed standard. Obviously the cam 29 may be shaped to dictate a desired program varying with time. If the cam 29 is circular then the core piece 31 retains its uniform coupling of the windings 32, 33 and 34 establishing a uniform temperature standard for comparison with the actual temperature.

We have indicated that the contact arm 40 is manually movable along the resistance 35 from a zero position in one direction plus and in the other direction minus. Such indications are of deviation between the actual and the desired value of temperature. The predetermined shape of the program cam 29 may be useful under different conditions which would indicate that a constant deviation of a few degrees in one direction or the other is desirable for a particular condition of operation. For example, if the furnace 6 is used to heat treat metal objects, then the general program (as arranged on the cam 29) of bringing the furnace 6 up to temperature and maintaining it at one or more pre-selected temperatures over given periods of time might hold true for the particular metal being treated. However, if one batch of castings are large compared to another batch of smaller castings, then while the program may hold constant for the two batches, still one might desirably be at a temperature of ten degrees above the other throughout the program. Such a control condition may be established by manually moving the contact arm 40 along the resistance 35 in either a plus or a minus direction depending upon whether the actual temperature is to deviate a constant amount above or a constant amount below the standard established by the position of the core 31 relative the windings 32, 33, 34

Figures 3, 6, 8:
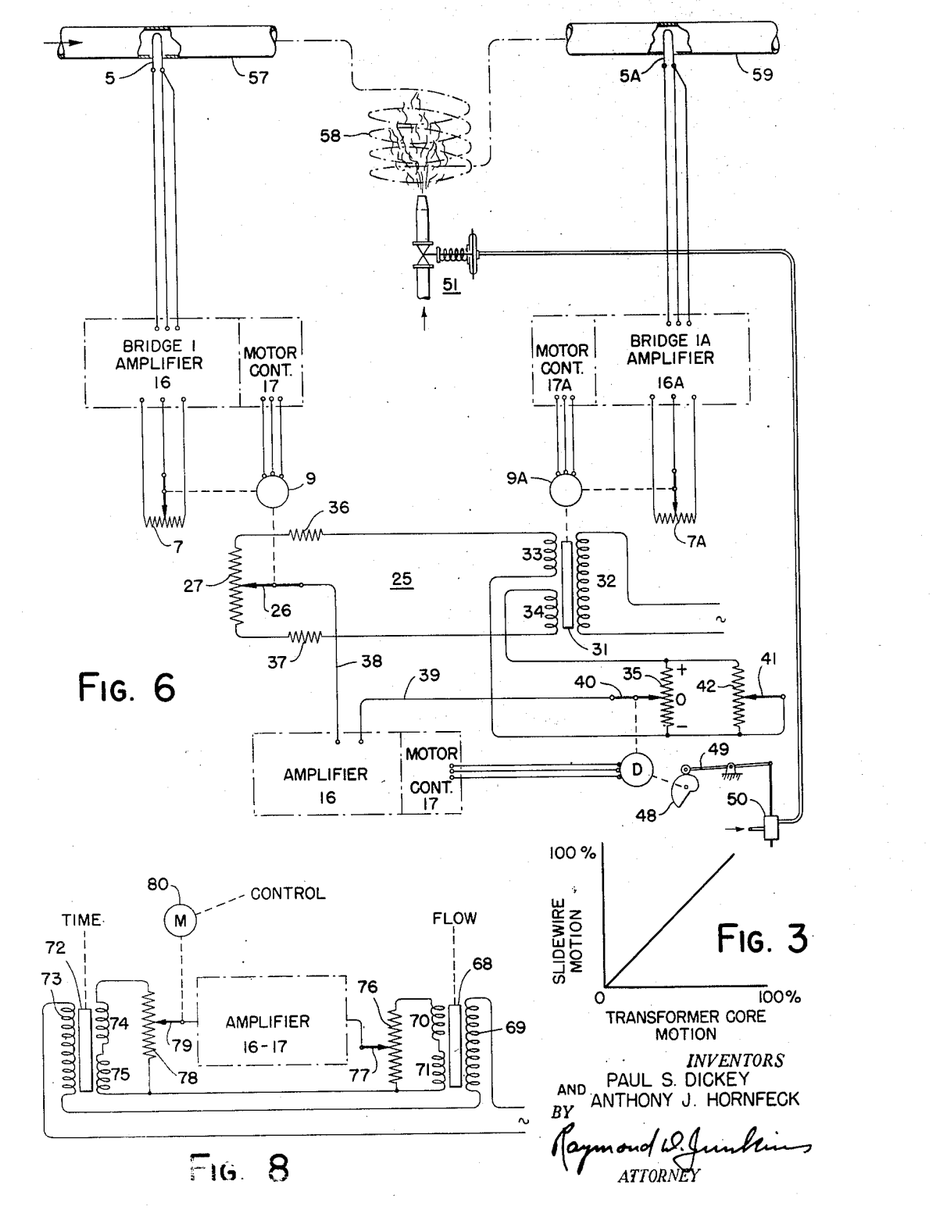
Fig. 3 is a graph of relations in connection with Fig. 2.
Fig. 6 is a circuit arrangement for showing temperature of a flowing fluid before and after passing through a heating furnace.
Fig. 8 is a portion of a program control.

The graduations adjacent the resistance 35 may be in degrees temperature or in percentage or otherwise. Reference to Fig. 3 shows a uniform proportionality between the motion of the slide wire contact 26 and motion of the transformer core 31. With this linear or straight line relation the deviation determined by the setting of the pointer 40 along the resistance 35 is a predictable and uniform measure of deviation. With an adequate control system functioning sensitive to the potential condition of the conjugate conductors 38, 39 the relation of the elements 40, 35 predetermines a constant deviation or difference between the actual temperature and the desired temperature irrespective as to whether the desired temperature is a uniform or constant temperature or is one varying with time in predetermined manner.

In the embodiment of Fig. 1 we provide an electrical control of the heat input of the resistor 13 to the electric furnace 6. We have shown in this connection a power controller 43 which forms no part of the present invention. This may be a General Electric Reactrol described in Patents 2,266,569, 2,285,172, 2,285,173 and 2,383,806, or any other adaptable power controller for the resistor 13. Our invention applies to the power controller 43, the establishment of an electrical value, through an amplifier 44 if necessary, responsive or sensitive to the potential condition of the conjugate conductors 38, 39 and thereby sensitive to the deviation network 25 continuously comparing the actual temperature at the element 5 with a predetermined or desired temperature. The output of the power controller 43 (input to the furnace 6) is in proportion to deviation or unbalance condition existing across 38, 39.

A distinction of this electrical circuit is that while the deviation network 25 is a balanceable network it is not (in this particular embodiment) balanced by means of movement of the contact 40 over the potentiometer 35 (following an unbalance caused by movement of 26 or 31) but becomes balanced again only when a correction has been applied to the heating of the furnace 6 with corresponding correction of the temperature to which the resistance element 5 is sensitive.

Assuming the loop circuit of the deviation network to be in balance and the magnetic core piece 31 fixed in position. A variation in temperature in the furnace 6, effective upon the resistance arm 5, results in a positioning of the contact arm 26 along the potentiometer 27 to a position representative of the new temperature. This produces an unbalance in the loop with a resulting potential across the conjugate conductors 38, 39 whose direction and magnitude is related to the direction and magnitude of movement of the arm 26 from the balanced position. The potential condition of the conductors 38, 39 is effective upon the power controller 43 for increasing or decreasing the electrical energy through the heater 13 to restore the temperature at the element 5 to predetermined desired value. The loop of the deviation network 25 is, therefore, not returned to a balanced condition until the temperature at the element 5 is returned to the desired standard value with consequent return of the arm 26 to its previous position along the resistor 27.

It will be apparent that the deviation loop may be thrown out of balance by a movement either of the arm 26 or of the core 31 and that either of such movements will result in an adjustment of the heater 13 for change in temperature to which the element 5 is sensitive. For example, if the system is in balance and the desired temperature exists at the element 5, then the time program cam 29 may call for a new temperature through a movement of the core 31. This unbalances the deviation loop, resulting in an adjustment of the heater 13 and a change in temperature to which the element 5 is sensitive. If the heater 13 brings such temperature to the newly desired value, the loop is again balanced but at a new position of the arm 26 and of the core 31.

In such a system as we have described there will exist a thermal lag from the time a change in electric energy is made through the resistor 13 and consequent change in temperature to which the element 5 is sensitive. Thus there will exist a lag between the time of movement of the core 31 and of the attainment of a new position of the arm 26 sufficient to balance the deviation loop.

If the program cam 29 is cut to a spiral or uniform rise characteristic, then a uniform time lag will exist between the temperature called for by the position of the plunger 31 and the temperature actually existing as indicated by the position of the arm 26. The steeper the rise of the cam 29 the greater will be the deviation between the two representations of temperature. That is, if the cam rise is very steep there will be a greater span in temperature between the temperature desired as indicated by position of the core 31 and the actual temperature as indicated by the position of the contact arm 26. This in simple language because the heating effect of the furnace cannot keep up with the demand for change in temperature.

Either the thermal lag of the heating system or the time lag between movement of the plunger 31 and movement of the contact 26 will produce a deviation between the desired temperature and the actual temperature. Such a deviation can be ascertained for any given installation or condition of operation and can be compensated for by movement of the contact 40 along the resistance 35. In other words, if it is ascertained on a given furnace installation that during normal operation there is a thermal lag of so many degrees in changing temperature, a certain amount of compensation can be taken care of through the elements 40, 35. The same is true in regard to a follow lag on a gradually changing temperature program of the cam 29. It is appreciated that a gradual change in temperature in one direction followed by a gradual change in the other direction may mean a plus deviation for one period of time, followed by a minus deviation. This could not be compensated for by a single adjustment of the arm 40 relative to the resistance 35. However, such conditions are usually not of the same extent or duration and the one of major consequence may be compensated for while the other condition may be neglected.

It is possible to incorporate in the shape of the cam 29 corrections for both positive and negative deviations after the characteristics of the system have been explored and studied. Thus the shape of the cam 29 may readily be changed to incorporate changes in desired program, as well as to incorporate corrections for deviation between the actual and the desired temperature, which deviations may result from thermal lag of the heating system or from mechanical and/or electrical follow lag.

Figure 2:
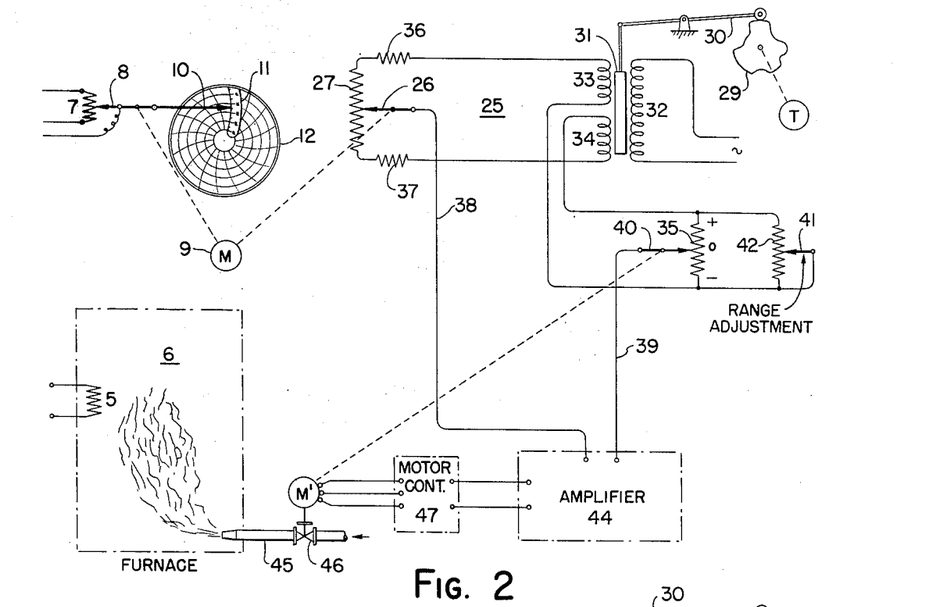
Fig. 2 is a diagrammatic showing of a portion of a measuring and control circuit applied to a fuel fired furnace.

Fig. 2 is an adaptation of control wherein the temperature of the furnace 6 to which the element 5 is sensitive is desirably to be maintained at a predetermined standard which may be a non-varying standard, or a standard programmed through a time actuated means. Control of the temperature of the furnace is obtained by variations in the rate of application of a fuel or other heating medium applied through the conduit 45 under the control of a regulating valve 46.

In Fig. 2 we have not duplicated the detailed showing of the elements 1, 16 and 17, which were explained in detail in connection with Fig. 1. Herein we show the temperature sensitive resistance 5 and the balancing resistance 7 of the measuring circuit, which latter functions (as in Fig. 1) to control the motor 9 to keep the measuring circuit continuously in balance whereupon the position of the contact arm 26 along the potentiometer 27 is continuously indicative of the actual temperature to which the element 5 is subjected. The deviation network 25 is substantially similar to that illustrated in Fig. 1 and is provided with a program cam 29 which may be circular if a uniform standard temperature is desired or may be formed to a shape corresponding to any desired program of temperature to be maintained. Here again the position of the core 31 relative the windings 32, 33, 34 is representative of the desired or standard temperature in comparison with the position of the contact arm 26 relative the potentiometer 27 representative of the actual temperature. Deviation between the actual and the standard temperatures is (in Fig. 2) continuously indicated by the position of the contact arm 40 along the balancing potentiometer 35. In other words, the deviation network 25 of Fig. 2 is continuously balanced through the agency of a balancing motor M'. If the two temperatures are alike, then the deviation indicator shows zero deviation. The actual temperature in deviating in one direction or the other from the desired or standard temperature produces an indication in a plus or a minus deviation direction and a graduated scale may be provided in connection with the elements 40, 35 graduated in percentage or in degrees temperature, or otherwise as desired.

For balancing the network 25 we provide that the conjugate conductors 38, 39 be connected to an amplifier 44 and motor control 47 to actuate the reversing motor M' for positioning the arm 40. This provides a balanceable loop network sensitive to departure of proper proportionality between the positions of the elements 26 and 31. If the actual temperature is as desired, then no deviation between the temperatures exists and the loop is in balance. If the actual temperature is above the desired temperature we may refer to this condition as a plus deviation, while if the actual temperature is below the desired temperature we may refer to this condition as a minus deviation of temperature. Thus if the loop network 25 is unbalanced in one direction or the other by inequality in the electrical representations of actual and desired temperatures the motor M' is actuated in proper direction to move the arm 40 along the potentiometer 35 until the loop 25 is again balanced. The position of the arm 40 relative the resistance 35 thus continually indicates the direction and extent of deviation of the actual temperature relative to the desired temperature.

In addition to providing a visual indication of deviation of actual temperature from the desired temperature we also provide (in Fig. 2) a control of the temperature responsive to the value and direction of deviation, if any. To accomplish this the reversing motor M' also positions the heating valve 46. Upon departure of temperature the valve 46 is positioned in a direction to return the temperature toward the desired value. With this type of control, however, the system may stabilize out at some other temperature slightly different from the exact desired value.

For instance, if the temperature increases the network 25 becomes unbalanced, the motor M' is rotated in the proper direction to rebalance the network through division of the resistance 35 and to position the valve 46 in amount and direction equivalent to the movement of the arm 40 over the resistance 35.

Thermal storage and lag conditions of the furnace may predicate a considerable change in the amount of heating supply to correct for a relatively few degrees difference in temperature. For example, if a cold charge of material to be heated is inserted in the furnace 6 the temperature will be lowered for the same rate of heat input through the conduit 45. The resultant deviation between the actual and desired temperature, evidenced by a new position of the arm 40 along the resistance 35, simultaneously results in a proportional positioning of the valve 46 to increase the rate of heat supply to the furnace. The system will tend to stabilize out to a balance condition at some new temperature slightly different from the desired temperature due to the fact that the increase in rate of heat supply is then sufficient to balance the increase in rate of heat absorption or withdrawal, but there has not been any additional amount of heat supplied to overcome the initial absorption of heat from the furnace to raise the charge of relatively cold material up to the temperature (whatever it may be) of the furnace.

Thus the temperature will stabilize out at some new value wherein the rate of heat supply balances the rate of heat loss as by radiation, leakage, etc.

There is, however, little tendency to overshoot or hunt with such a control system. While the system is very stable in this regard, control is to a band of temperatures geared directly to the position of the valve 46. This band of geared operation may be adjusted to be a wide or narrow band of proportionality. A proportional band adjustment is provided through manual movement of the arm 41 along the resistance 42. If the geared range is narrowed it means that full travel from open to shut position of the valve 46 will occur for relatively small deviations in temperature. If the geared range or proportional band is widened it means that full travel of the regulating valve 46 will be accomplished for a relatively wider deviation in temperatures. Throughout the proportional band each position of the valve 46 corresponds to a definite deviation value, or in other words to a definite actual temperature to which the system will stabilize out. As the proportional band is narrowed the tendency for stability lessens and there is a greater possibility of overtravel and hunting. This will be evident, for open minute deviations in temperature the heating valve 46 may go from an open to a closed position. In other words, as the proportional band is narrowed the system approaches a floating type of control.

Figure 4:
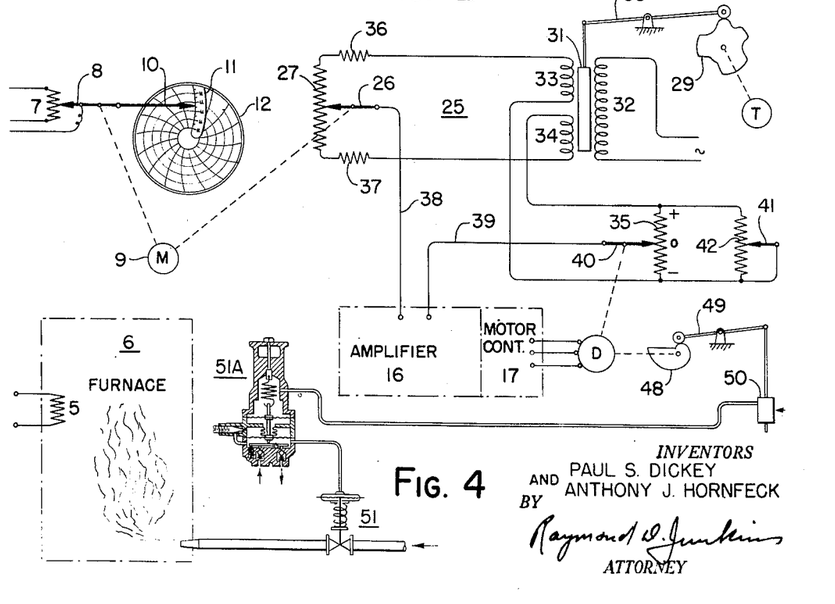
Fig. 4 is an embodiment somewhat similar to the diagrammatic arrangement of Fig. 2.

In Fig. 4 we illustrate another embodiment of geared control wherein the motor D, in addition to positioning the contact 40 along the resistance 35, positions a cam 48. Riding the contour of the cam 48 is a roller arm 49 effective in positioning a pilot valve 50 to establish a fluid pressure effective in the positioning of a heating control valve 51. The pilot valve may be of any known type continuously establishing a fluid loading pressure representative of deviation between the actual and the desired temperature at the element 5.

The loading pressure proportional to deviation would, if applied directly to the diaphragm motor valve 51, supply a regulation of the heating supply to the furnace 6 geared to the extent of departure of the actual temperature from the desired temperature, or the direction and extent of deviation.

However, in Fig. 4 the loading pressure output of pilot valve 50 is applied to a standardizing relay 51A of the general type disclosed and claimed in Patent Re. 21,804 to Gorrie. Basically the fluid pressure control system operates to first give a response proportional to the rate of change in magnitude of the condition being controlled, and thereafter to give a continuing response initially proportional to the amount of deviation of the controlled condition from the desired magnitude. In other words, a control of relatively high sensitivity but low speed is superimposed upon a control of low sensitivity but high speed.

Figure 5:
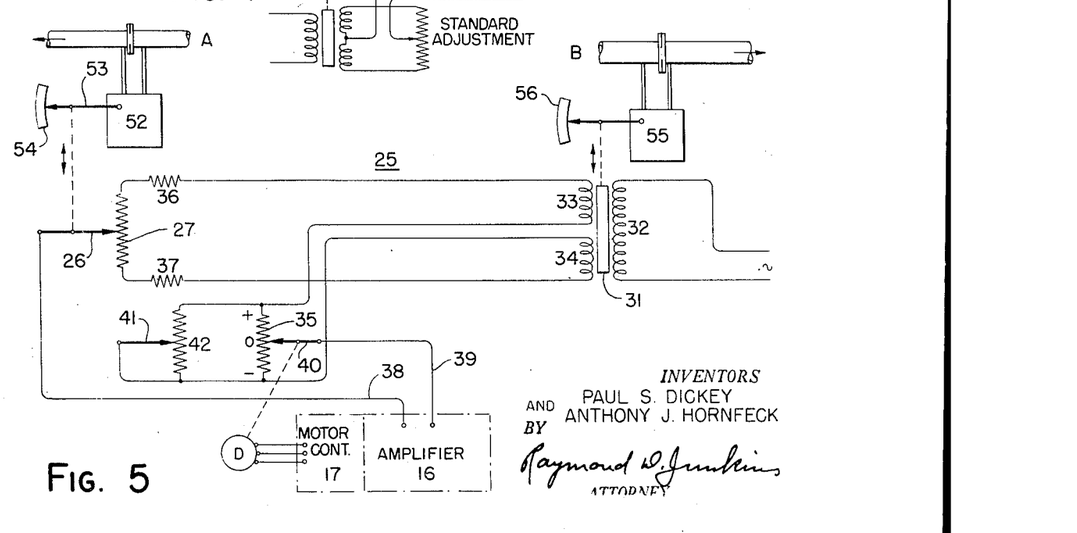
Fig. 5 is a diagrammatic circuit arrangement as used in comparing two fluid rates of flow.

In Fig. 5 we show an embodiment adapted to compare two fluid rates of flow by continuously subtracting one from the other to show equality or deviation in either direction. A fluid rate of flow A is measured by a meter 52 having a positionable arm 53 continuously indicating relative an index 54 and positioning the contact arm 26 along the resistance 27. The fluid flow B is measured by a meter 55 similarly continuously indicating upon an index 56 and positioning the transformer core 31 relative to the windings 32, 33 and 34. The deviation network produces a movement of the arm 40 along resistance 35 to balance the network (following an unbalance thereof) and to indicate whether the flows A and B are equal or whether A is greater or less than B. The graduation of the resistance 35 may be in percent or terms of fluid flow rate, or otherwise as desired, and may indicate which of the fluid flows is the greater and how much greater it is. Obviously the motor D may be utilized in a manner similar to that shown in Fig. 4 for controlling A or B or the ratio or difference between them or other variables as desired. The circuit in general provides for the continuous subtraction of variables, either of which may exceed the other.

In Fig. 6 we illustrate an embodiment useful in controlling the heating of a flowing fluid, as for example in the processing of hydrocarbons flowing through a still or other treating zone. The fluid may enter a conduit 57 past the temperature sensitive element 5 and flow in the direction of the arrow through a heating coil 58 leaving the heater through a portion of the conduit 59 in which is located a temperature sensitive element 5A. Each of the elements 5, 5A is embodied in a measuring system similar to that described in connection with Fig. 1 for controlling the directional rotation of motors 9, 9A, which respectively balance the measuring circuit through positioning of contact arms 7, 7A. At the same time the motors 9, 9A respectively position the contact arm 26 and the transformer core 31 of the deviation network 25. As previously explained, the network, upon deviation or unbalance, causes an actuation of the motor D to rebalance the network. Additionally, the motor D, through the elements 48, 49 and 50, produces a fluid pressure effect continuously representative of deviation in temperatures and useful in controlling a heat supply valve 51 for heating the coil 58.

In the present embodiment it is expected that, so long as heat is being applied to the coil 58 there will be a greater temperature at the element 5A than at the element 5 and the network continuously subtracts the two, but presumedly the difference is always in the same direction. During operation, so long as the desired difference in temperature exists between the location 5 and 5A the deviation indicator 40 will be at zero, or balanced position, along the resistance 35 and the network will be in balance. If for ambient or other extraneous reasons the temperature difference is not that desired, then deviation from the desired relationship will be shown by the position of the pointer 40 along the index of the resistance 35. In this embodiment a visual indication is given, not of deviation of desired temperature from a standard temperature, but of any deviation of an actual difference in temperature from a desired difference in temperature.

Figure 7:
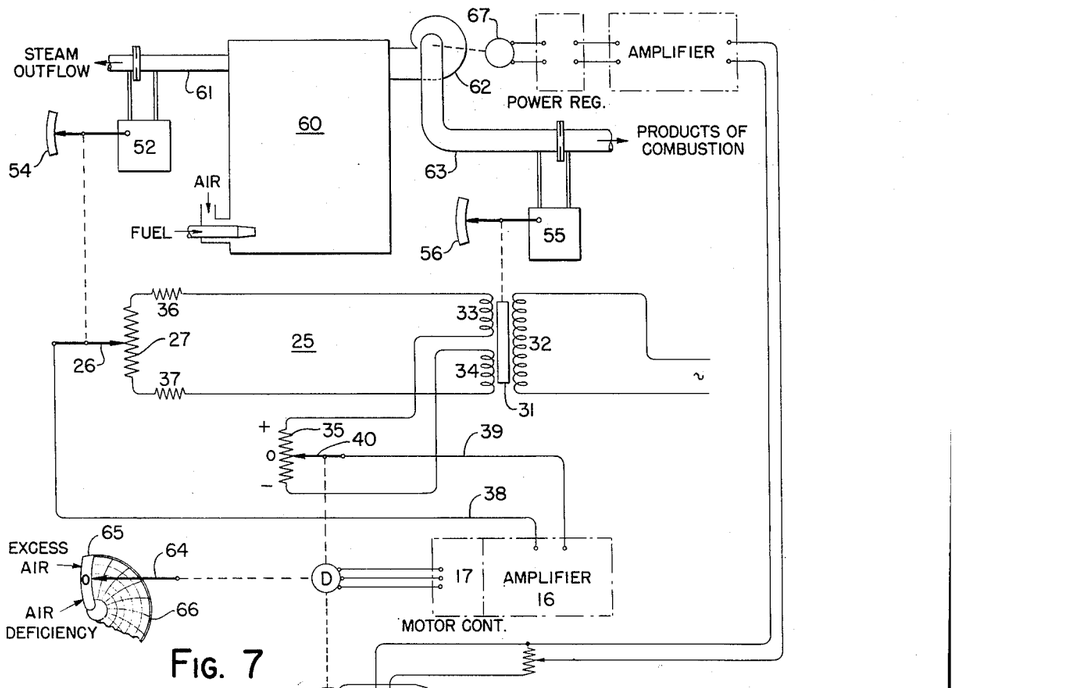
Fig. 7 illustrates diagrammatically apparatus for effecting the comparison of two variable factors in the operation of a fuel fired vapor generator.

In Fig. 7 we illustrate an embodiment of our invention adapted to a control of the efficiency of combustion in a vapor generator. Fuel and air forming the elements of combustion are supplied to a vapor generator 60 from which the rate of steam outflow through the pipe 61 may be continuously measured by a meter 52. The products of combustion leave the furnace through a fan 62 and stack 63. Preferably the rate of supply of fuel is controlled by steam pressure, although this may be considered only as an example and forming no part of the present invention. Air for combustion of the fuel is drawn in by the suction of the induced draft fan 62 and is therefore under the control of the speed of said fan.

It is well recognized that most efficient combustion occurs when the proper proportioning of air to fuel is had. Furthermore, that a continuous guide to proper operation is provided by a comparison of the rate of vapor outflow with the rate of discharge of the products of combustion. On the one hand the rate of steam produced is a measure of the utilization of heat, while a measure of the air used for combustion is indicative of the rate of heat liberation or heat supplied to the furnace. A comparison of the two thus gives an indication of the efficiency of the combustion.

The rate of heat liberation or heat supplied to the furnace may be inferentially obtained through a continuous measurement of the rate of discharge of products of combustion. This is true because it is recognized that for say every ten thousand B. t. u. of heat liberated from fuel being burned there is a certain amount of air required for most efficient combustion and that the products of combustion will constitute so many pounds or cubic feet or other definite measure. This is substantially true regardless of the type of fuel that is used. If then a system is calibrated to show a desired volume rate of products of combustion leaving a furnace in comparison to the rate of steam flow from the vapor generator any excess supply of air or deficiency of air for combustion will be clearly manifested relative a desired relationship. Inasmuch as fuel and heat wastage occurs whenever there is an excess of air, or a deficiency of air, it will be apparent that a continuous indication of steam flow-air flow relationship provides a highly desirable guide to optimum furnace operation. Such a guiding system we have illustrated in Fig. 7.

In the deviation network 25 we continuously position the contact arm 26 representative of rate of steam outflow. We continuously position the transformer core 31 representative of rate of outflow of the products of combustion. Departure from balanced condition produces rotation of the motor D for positioning the arm 40 until the network is again in balance, and at the same time positions an indicating-recording pen 64 relative an index 65 and a revcluble chart 66. Preferably the scale 65 and chart 66 have a center zero representative of optimum steam flow-air flow relation or no deviation from such relationship. The scale and chart may be graduated to show directly an excess of air or a deficiency of air whereby the operator may make adjustments (under hand control conditions) to return the steam flow-air flow relationship to desired condition.

As in the embodiments previously described the network may additionally control the speed of the fan 62 by speed control of the driving motor 67. This will provide a geared control system similar to that described in connection with Fig. 2.

In Fig. 8 we illustrate a portion of a program control of somewhat different electrical characteristics than those previously herein described. Taken merely as an example, we indicate that a fluid rate of flow (representative of any variable) continuously positions the core 68 of a transformer having primary winding 69 and secondary windings 70, 71. Similarly a time element, such as a program cam or device, continuously positions the core 72 relative the transformer windings 73, 74, 75. Shunted across the windings 70, 71 is a potentiometer resistance 76 having a manually adjusted contact arm 77. Shunted across the windings 74, 75 is a potentiometer resistance 78 having a balancing contact arm 79 positioned by a motor 80 which is under the control of an amplifier motor control 16, 17 previously described.

A hand adjusted element 77 provides the necessary calibration and range treatment for the system. The position of the core 68 representative of actual flow value is continuously compared to the position of the core 72 representative of desired flow value. If the actual flow is at the desired or standard value, then the circuit is in balance and motor 80 is stationary. If unbalance occurs the motor 80 is energized in proper direction to position the arm 79 along resistance 78 until the circuit is again balanced. In so moving, the motor 80 may position an indicator or may operate a control for the same or other variables. The circuit provides a simple time cycle or program in comparison with flow or other variable and including telemetric features. For example, the elements 68, 69, 70, 71 may be located at a flow meter a considerable distance away from the rest of the circuit apparatus.

While we have chosen certain preferred embodiments to illustrate and describe, it will be appreciated that these are by way of example only and we do not desire to be limited thereto.

Certain features of our present invention, disclosed but not claimed herein, are disclosed and claimed in our copending divisional application Ser. No. 71,424, filed January 18, 1949.

What we claim as new, and desire to secure by Letters Patent of the United States, is:

1. In a deviation network of the type described, in combination; a transformer having a primary for energization by alternating current, a pair of spaced secondaries and a core movable relative to the secondaries to oppositely effect their inductive coupling to said primary; a first resistor connected between said secondaries; a second resistor connected across said secondaries; a slider for each resistor; means connecting said sliders into a conjugate conductor; means to move one of said sliders in response to and representative of values of a variable; and means to move said core in response to and representative of values of another variable; the position of the slider on the remaining resistor when the current in the conjugate conductor is zero being representative of the deviation between the values of said variables.

2. In a deviation network of the type described, in combination; a transformer having a primary for energization by alternating current, a pair of spaced secondaries and a core movable relative to the secondaries to oppositely effect their inductive coupling to said primary; a first resistor connected between said secondaries; a second resistor connected across said secondaries; a slider for each resistor; means connecting said sliders into a conjugate conductor; means to move one of said sliders in response to and representative of values of a variable; and means to move said core in response to and representative of values of another variable; the potential and phase of the current in the conjugate conductor being representative of the deviation between the values of said variables when the position of the slider on the remaining resistor is in the normal balance position.

3. In a network for controlling by deviation, in combination; a transformer having two spaced secondaries, a primary energized by alternating current and a core movable to inversely effect the coupling of the secondaries to the primary; a closed series loop composed of said secondaries and two resistors alternately arranged; a slider for each resistor connected together by a conjugate conductor; means responsive to changes in a variable to move one of said sliders to a position on its resistor representative of the value of the variable; means to move said core to positions representative of desired values of said variable; and means responsive to the phase and intensity of potential in said conjugate conductor to control instrumentalities to restore the value of the variable to that called for by the position of the said core.

4. In a network for controlling by deviation, in combination, a transformer having two spaced secondaries, a primary energized by alternating current and a core movable to inversely effect the coupling of the secondaries to the primary; a closed series loop composed of said secondaries and two resistors alternately arranged; a slider for each resistor connected together by a conjugate conductor; means responsive to changes in a variable to move one of said sliders to a position on its resistor representative of the value of the variable; means to move said core to positions representative of desired values of said variable; means responsive to the phase and intensity of potential in said conjugate conductor to control instrumentalities to restore the value of the variable to that called for by the position of the said core; and means actuated by said responsive means to move said second slider to restore balance in said loop.

5. In a network for controlling by deviation, in combination; a transformer having two spaced secondaries, a primary energized by alternating current and a core movable to inversely effect the coupling of the secondaries to the primary; a closed series loop composed of said secondaries and two resistors alternately arranged; a slider for each resistor connected together by a conjugate conductor; means responsive to changes in a variable to move one of said sliders to a position on its resistor representative of the value of the variable; means to move said core to positions representative of desired values of said variable; electromagnetic reversible means responsive to phase and amplitude of potential in said conjugate conductor for the operation of control means, and a mechanical connection between said reversible means and the other slider for balancing the network.

6. In a deviation network, in combination, a bridge circuit comprising connected resistors each having a movable contact, a conjugate conductor connecting said movable contacts and dividing the bridge into two sections, means to induce alternating current into each bridge section to energize the same comprising a dual secondary transformer having one secondary connected in each section, a primary and a core movable to inversely control the coupling of the secondaries to the primary, and means in said conjugate conductor responsive to unbalance current therein.

7. In a deviation network, in combination, a bridge circuit comprising connected resistors each having a movable contact, a conjugate conductor connecting said movable contacts and dividing the bridge into two sections, means to induce alternating current into each bridge section to energize the same comprising a dual secondary transformer having one secondary connected in each section, a primary and a core movable to inversely control the coupling of the secondaries to the primary, means in said conjugate conductor responsive to unbalance current therein; and means to actuate one of said movable members from said responsive means.

8. Temperature control means for a furnace or the like comprising in combination, a furnace, heating means for said furnace, a controller for said means, a resistance thermometer subject to the temperature of the furnace and including a motor actuated to indicate the temperature, a deviation bridge having connected resistors each having a movable contact, a conjugate conductor connecting said movable contacts and dividing the bridge into two sections, means to induce alternating current into each section to energize the same comprising a dual secondary transformer having one secondary connected in each section, a primary and a movable core to inversely control the coupling of the secondaries to the primary, means connecting said motor to actuate one of said movable elements, program means to move another of said movable elements to establish desired temperature standards changeable with time, and means responsive to unbalance current in said conjugate conductor for actuating said heating means controller.

9. Temperature control means for a furnace or the like comprising in combination, a furnace, heating means for said furnace, a controller for said means, a resistance thermometer subject to the temperature of the furnace and including a motor actuated to indicate the temperature, a deviation bridge having connected resistors each having a movable contact, a conjugate conductor connecting said movable contacts and dividing the bridge into two sections, means to induce alternating current into each section to energize the same comprising a dual secondary transformer having one secondary connected in each section, a primary and a movable core to inversely control the coupling of the secondaries to the primary, means connecting said motor to actuate one of said movable elements, program means to move another of said movable elements to establish desired temperature standards changeable with time, means responsive to unbalance current in said conjugate conductor for actuating said heating means controller, and a mechanical connection between the said responsive means and the remaining movable element for balancing said deviation bridge.

10. The combination of claim 9 in which the last mentioned movable element is associated with one of said resistors, and means electrically connected to said resistor for adjusting the range of control of said heating means.

11. Apparatus for determining the difference between two variables comprising measuring means for each variable including mechanism for actuating an indicator, a deviation network comprising connected resistors each having a movable contact, a conjugate conductor connecting said movable contacts and dividing said network into two sections, means to induce alternating current into each network section to energize the same comprising a dual secondary transformer having one secondary connected in each section, a primary and a movable core to inversely control the coupling of the secondaries to the primary, means connecting one of said mechanisms to actuate said core, means connecting the other mechanism to actuate one of said movable contacts, and means responsive to unbalance current in the conjugate conductor to actuate the remaining movable contact to balance the network and indicate the said difference.

12. The combination as set forth in claim 11 in which means is provided to maintain a differential in said variables and a control for said means actuated by said responsive means.

13. Apparatus for comparing fluid flow in two conduits comprising in combination, a flow meter for each conduit, each meter having a movable power member for actuating an indicator, a deviation bridge associated with said meters and including a resistor having a slider connected for movement by one of said power members, a second resistor having a slider, said resistors being connected into said bridge, a conjugate conductor connecting said sliders and separating the bridge into two loops, a dual secondary transformer having an a.-c. energized primary, a core movable by the remaining power member to inversely control the coupling of the secondaries to the primary, each secondary being connected into one bridge loop between the resistors therein to energize that loop, a motor responsive to phase and potential of unbalance current in said conjugate conductor, and a mechanical connection between said motor and the remaining slider to balance said bridge, the position of the remaining slider indicating the difference in flow in the said conduits.

14. In a system for heating fluid, in combination, a fluid heater having a source of heat, a conduit leading to said heater, a discharge conduit for said heater, a temperature indicating mechanism for each conduit and including a power member for actuating an indicator, a deviation bridge associated with said temperature indicating mechanisms and including a resistor having a slider connected for movement by one of said power members, a second resistor having a slider, said resistors being connected into said bridge, a conjugate conductor connecting said sliders and separating the bridge into two loops, a dual secondary transformer having an a.-c. energized primary, a core movable by the remaining power member to inversely control the coupling of the secondaries to the primary, each secondary being connected into one bridge loop between the resistors therein to energize that loop, a motor responsive to phase and potential of unbalance current in said conjugate conductor, means actuated by said motor to control the rate of application of heat from said source, and a mechanical connection between said motor and the remaining slider to balance the bridge and indicate the gain in temperature in said heater.

15. In a deviation network, in combination, a pair of identical loop circuits each including a portion of each of two resistors and a transformer secondary, a common conjugate conductor for said loops having its ends attached to sliders which divide the resistors into the two parts allotted to the loops, means to induce alternating current into the loops through the respective secondaries, means to inversely adjust the potentials induced into said secondaries, and motor means responsive to phase and unbalance potential in the conjugate conductor.

16. The combination defined in claim 15 in which the said motor is arranged to actuate one of said sliders to rebalance the network after unbalance by movement of the potential adjusting means.

PAUL S. DICKEY.
ANTHONY J. HORNFECK.

REFERENCES CITED

The following references are of record in the file of this patent:

UNITED STATES PATENTS

| Number | Name | Date |
|---|---|---|
| 2,025,542 | Lugar | Dec. 24, 1935 |
| 2,050,629 | Quereau | Aug. 11, 1936 |
| 2,363,690 | Razek | Nov. 28, 1944 |
| 2,406,221 | Hornfeck | Aug. 20, 1946 |
| 2,412,263 | Hartig | Dec. 10, 1946 |
| 2,420,415 | Bristol | May 13, 1947 |